United States Patent [19]

Banno et al.

[11] Patent Number: 4,876,606
[45] Date of Patent: Oct. 24, 1989

[54] IMAGE FORMING SYSTEM

[75] Inventors: Masahiko Banno, Yokohama; Yasushi Nakazato, Tokyo, both of Japan

[73] Assignee: Ricoh Company, Ltd., Tokyo, Japan

[21] Appl. No.: 186,604

[22] Filed: Apr. 27, 1988

[30] Foreign Application Priority Data

Apr. 28, 1987 [JP] Japan ................................ 62-103283

[51] Int. Cl.⁴ .............................................. H04N 1/32
[52] U.S. Cl. .................................... 358/434; 358/443; 358/476; 340/825.05
[58] Field of Search ............... 358/257, 280, 286, 293, 358/285, 296; 340/825.05, 825.06

[56] References Cited

U.S. PATENT DOCUMENTS 4,549,219 10/1985 Sue et al. ............................. 358/257

FOREIGN PATENT DOCUMENTS 36217 6/1987 Japan .

Primary Examiner—Edward L. Coles, Sr.
Attorney, Agent, or Firm—Cooper & Dunham

[57] ABSTRACT

An image forming system comprises one or a plurality of image forming apparatuses and a host system coupled thereto. Each image forming apparatus is provided with a control part for reading out status information on the image forming apparatus at an arbitrary time. The obtained status information may be displayed or printed at the image forming apparatus and/or supplied to the host system.

20 Claims, 8 Drawing Sheets

IMAGE FORMING SYSTEM

BACKGROUND OF THE INVENTION

The present invention generally relates to image forming systems, and more particularly to an image forming system which produces status information indicative of a status of an image forming apparatus of the image forming system.

For example, a general image forming system comprises an image forming apparatus and a host computer. The image forming apparatus includes a central processing unit (CPU), a plurality of printers and respective printer control devices. Copying machines, facsimile machines and the like can also be used in place of the printers. The CPU discriminates the status of the printer. The status information concerns information such as the time a predetermined part of the printer should be replaced depending on the serviceable life thereof, the existence of a fault in a certain part of the printer and the like. When a need arises to display the status information such as when the serviceable life of the predetermined part ends, the CPU supplies the status information to the printer control device so as to display the status information on a display part of the printer.

For example, when a serviceable life of a part of the printer ends, a display is made on the display part to alert the operator that it is time to replace this part of the printer. Similarly, when the printer runs out of paper, a display is made on the display part to indicate that there is no more paper left.

However, the status information is displayed on the display part of the printer only when the need arises, that is, only when the time comes to alert the operator. Furthermore, the status information is only supplied to the printer control part. For these reasons, the operator cannot find out the status of the printer until a display is made on the display part. In addition, a serviceman cannot check the status of the printer at the host computer because the status information is not supplied to the host computer. Therefore, it is extremely difficult to constantly control and maintain the image forming system in an optimum operating state.

In other words, suppose that there are first, second and third printers connected to the host computer, and the first and second printers have parts which need to be replaced after ten more prints are made. However, the third printer has no parts to be replaced for still another hundred prints. If the operator uses the first printer to make thirty prints, a display alerts the operator to replace the part after ten prints are made. In this case, the operator has to once stop the printing operation and replace the appropriate part of the printer before making the remaining prints. Alternatively, the remaining prints must be made on a printer other than the first printer. However, the operator has no way of knowing which one of the second and third printers is capable of making the remaining prints without interruption, that is, without requiring a change in parts or a supply of expendables (supplies).

Similarly, some parts of the printer cannot be replaced by the operator and requires a skilled serviceman. For example, even in a case where the serviceman is called to replace a certain part of the first printer, the serviceman has no way of knowing whether or not the printers inclusive of the first printer have parts which need to be replaced in a short period of time. In extreme cases, the second printer may have a predetermined part which needs replacement after ten more prints are made, but the serviceman has no way of knowing this although it would be more efficient to also replace this predetermined part of the second printer while replacing the certain part of the first printer.

Therefore, the conventional image forming system suffers problems in that there is no way of knowing the status of the printers and the like of the image forming system until a problem occurs, that is, the time comes to replace a part or supply an expendable, a fault occurs and the like.

SUMMARY OF THE INVENTION

Accordingly, it is a general object of the present invention to provide a novel and useful image forming apparatus in which the problems described heretofore are eliminated.

Another and more specific object of the present invention is to provide an image forming system which is provided with means for reading out status information on an image forming apparatus at an arbitrary time. The obtained status information may be displayed in a display part of the image forming apparatus and/or supplied to a host computer which is coupled to the image forming apparatus to constitute the image forming system. According to the image forming system of the present invention, it is possible to constantly control and maintain the image forming apparatus in an optimum operating state because the status information is obtainable at an arbitrary time and the status information can be obtained at the image forming apparatus and at the host computer. The present invention is especially advantageous when the image forming system comprises a plurality of image output devices such as printers, since it is possible to selectively use predetermined printers depending on the job to be performed.

Still another object of the present invention is to provide an image forming system comprising an image forming apparatus and a host system coupled to the image forming apparatus. The image forming apparatus at least comprises an image forming part for forming an image, a sensor part for detecting status information on the image forming apparatus, a memory for storing the status information, an operation and display part for entering an instruction to the image forming apparatus and for displaying a message, and a control part for controlling an operation of the image forming apparatus. The host system is coupled to the image forming apparatus through the control part, and the control part has means for controlling the memory to read out the status information at an arbitrary time. According to the image forming system of the present invention, the operator and serviceman can be aware of exactly when a part of the image forming apparatus will need to be replaced and when a supply of an expendable will become necessary because it is possible to know the status information at an arbitrary time. In other words, it is possible to foresee problems which may occur in the image forming apparatus before they actually occur. As a result, the image forming apparatus can be maintained in an optimum operating state and the maintenance of the image forming apparatus can be carried out with a high efficiency, thereby making the reliability of the image forming system extremely high.

A further object of the present invention is to provide an image forming system comprising a plurality of image forming apparatuses and a host system coupled to each of the image forming apparatuses. Each image forming apparatus comprises at least an image forming part for forming an image, a sensor part for detecting status information on the image forming apparatus, a memory for storing the status information, an operation and display part for entering an instruction to the image forming apparatus and for displaying a message, and a control part for controlling an operation of the image forming apparatus. The host system is coupled to each of the image forming apparatuses through the control part, the control part in each of the image forming apparatuses has means for controlling the memory to read out the status information at an arbitrary time. According to the image forming system of the present invention, it is possible to use the image forming apparatuses with approximately the same frequency, make the maintenance timings of the image forming apparatuses approximately coincide, and the like, by selecting the image forming apparatus to be used for each job based on appropriate status information. It is possible to ensure completion of the job by selecting the image forming apparatus having parts with the longest remaining serviceable lives. If the first selected image forming apparatus cannot complete the job for some reason, another suitable image forming apparatus will be selected automatically to positively complete the job. As a result, each of the image forming apparatuses can be maintained in an optimum operating state and the maintenance can be carried out with a high efficiency, thereby making the reliability of the image forming system extremely high.

Other objects and further features of the present invention will be apparent from the following detailed description when read in conjunction with the accompanying drawings.

DETAILED DESCRIPTION

Figure 1:
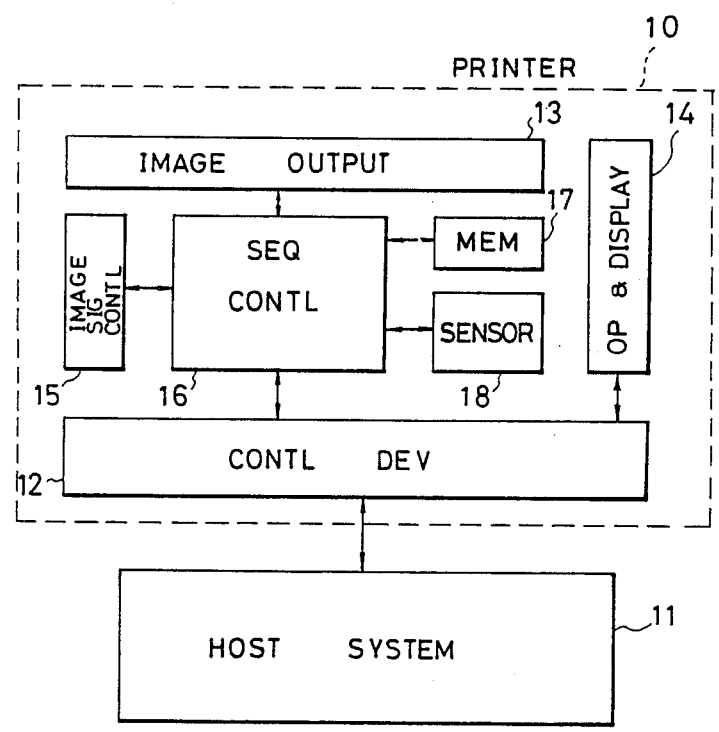
FIG. 1 is a system block diagram generally showing a first embodiment of the image forming system according to the present invention.

FIG. 1 generally shows a first embodiment of the image forming system according to the present invention. The image forming system comprises a printer 10 and a host system 11 coupled to the printer 10. The printer 10 comprises a printer control device 12, an image output part 13, an operation and display part 14, an image signal control part 15, a sequence control part 16, a memory 17, and a sensor part 18. The host system 11 is coupled to the printer 10 through the printer control device 12. For example, an electrically erasable programmable read only memory (EEPROM) may be used for the memory 17. The sensor part 18 includes a plurality of sensors for detecting various status information on the printer 10.

The printer control device 12 controls the print operation and the like of the printer 10 responsive to an instruction from the host system 11. The host system 11 is constituted by a microcomputer, a personal computer, a main frame computer or the like. The status information indicates the operating state, abnormal state and the like of the printer 10, and the status information from the sensor part 18 is stored in the memory 17 through the sequence control part 16. For example, the status information includes quantities of paper used and left in the printer 10, times when serviceable lives of parts end and require replacements, a record of faults and the like occurred in the printer, 10, a maintenance record on the printer 10, a serviceman maintenance record on the printer 10, a record on jams occurred in the printer 10, a total running time of the printer 10 and the like.

For example, the quantities of paper used and left in the printer 10 may include information on the total number of prints made, a total number of prints made after a quantity of paper is supplied during a job to enable completion of the job, and the remaining quantity of paper in the printer 10. The maintenance record may include a time when the toner needs to be supplied, and times when parts needs to be replaced. The parts are, for example, a photosensitive drum, a cleaning unit, a charger, a shield plate, an ozone filter, a fixing part, and a developer of the printer 10. The serviceman maintenance record may include a maintenance record on an optical system, a paper supplying system, a paper ejecting system, a driving system and the like of the printer 10. The record on the jams occurred in the printer 10 may include a record on the number of jams occurred and the locations of the jams.

A description will now be given for the case where the times when serviceable lives of parts end and require replacements are stored in the memory 17 as the status information. For convenience' sake, it is assumed that the status information stored in the memory 17 concerns the serviceable life of the photosensitive drum (not shown) of the printer 10. Parts of the printer 10 such as the photosensitive drum have predetermined serviceable lives and require replacements when the respective serviceable lives end. As for the photosensitive drum, the end of the serviceable life thereof is detected from a total rotation time for which the photosensitive drum has rotated.

The sequence control part 16 of the printer 10 uses a portion of the memory 17 as a counter for counting the total rotation time of the photosensitive drum. The rotation of the photosensitive drum is detected by one of the sensors of the sensor part 18. Hence, the sequence control part 16 makes the counter within the memory 17 count up proportionally to the rotation time of the photosensitive drum. When a counted value of the counter within the memory 17 reaches a predetermined value corresponding to the end of the serviceable life of the photosensitive drum, the sequence control part 16 displays a certain message on the operation and display part 14 to indicate that it is time to replace the photosensitive drum. In addition, the sequence control part 16 sets within the memory 17 a flag PSDF which requests the replacement of the photosensitive drum.

The printer control device 12 which controls the printer 10 is designed to read out at an arbitrary time the counted value of the counter within the memory 17 through the sequence control part 16. Hence, the printer control device 12 can supply the read out counted value from the memory 17 to the host system 11 responsive to a read-out request from the host system 11.

For example, the status information and the like stored in the memory 17 may be stored in an encoded form. In this case, the stored encoded information read out from the memory 17 is converted in the printer control device 12 into a message which can easily be understood by the operator and serviceman. In addition, the message obtained in the printer control device 12 may be kept in the form of a file for access by the host system 11. In other words, the file on the message is supplied to the host system 11 in response to a command entered from the host system 11.

Therefore, it is possible to know at an arbitrary time the status information on the printer 10. The status information read out from the memory 17 may be displayed on the operation and display part 14 of the printer 10 or printed on the printer 10. It is also possible to display the status information read out from the memory 17 at the host system 11. Because it is possible to know the status information at an arbitrary time, the operator and serviceman can be aware of exactly when a part of the printer 10 will need to be replaced and when a supply of an expendable will become necessary. In other words, it is possible to foresee problems which may occur in the printer 10 before they actually occur. As a result, the printer 10 can be maintained in an optimum operating state and the maintenance of the printer 10 can be carried out with a high efficiency, thereby making the reliability of the image forming system extremely high.

Figure 2:
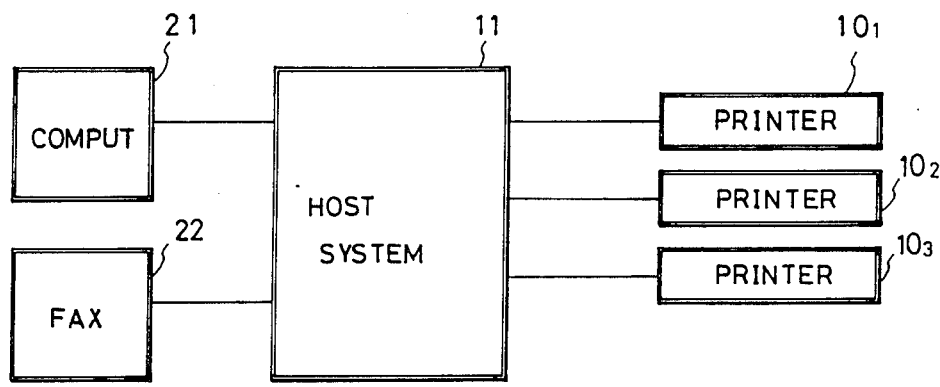
FIG. 2 is a system block diagram generally showing a second embodiment of the image forming system according to the present invention.

FIG. 2 generally shows a second embodiment of the image forming system according to the present invention. In FIG. 2, those parts which are the same as those corresponding parts in FIG. 1 are designated by the same reference numerals, and a description thereof will be omitted. The image forming system shown in FIG. 2 comprises the host system 11, printers $10_1$, $10_2$ and $10_3$ coupled to the host system 11, and a personal computer 21 and a facsimile machine 22 respectively coupled to the host system 11.

Figure 3:
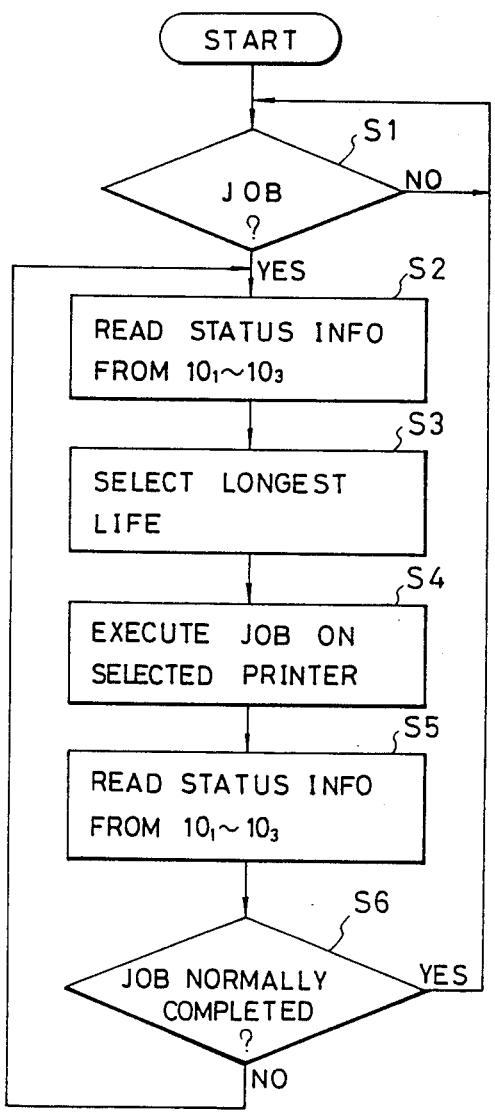
FIG. 3 is a flow chart showing a first embodiment of the operation of a host system in the second embodiment of the image forming system.

FIG. 3 shows a first embodiment of the operation of the host system 11 in FIG. 2. A step S1 discriminates whether or not a request for a job is entered. When the discrimination result in the step S1 becomes YES, a step S2 reads out the status information from the memory 17 through the printer control device 12 in each of the printers $10_1$ through $10_3$. A step S3 selects one of the printers $10_1$ through $10_3$ which is most suited for carrying out the job. In the present embodiment, the step S3 selects one of the printers $10_1$ through $10_3$ having the photosensitive drum with the longest remaining serviceable life. A step S4 carries out the job on the selected one of the printers 101 through 103, and a step S5 reads out the updated status information from the memory 17 of the selected printer. A step S6 discriminates whether or not the job is completed normally. The process returns to the step S1 when the discrimination result in the step S6 is YES but returns to the step S2 when the discrimination result in the step S6 is NO.

The selection of printer in the step S3 may be carried out based on various status information. For example, the selection of the printer may be based on whether or not the printer has sufficient quantities of paper and toner for completing the job, whether or not the printer has a part with a serviceable life which ends before the job is completed, whether or not the printer has records of unusually large number of faults and jams occurred in the printer, and the like. By selecting the printer with records of small number of or no faults and jams occurred in the printer, it is possible to ensure the positive execution of the job. In addition, the selection of the printer may be carried out based on one or more kinds of status information.

The step S5 reads the updated status information from the memory of the selected printer. Hence, it is possible to know whether or not a message is received from the selected printer while carrying out the job. The message may indicate that the selected printer is out of paper, toner or other expendables, a maintenance is required, a fault occurred, and the like. Accordingly, when a fault is detected in the step S5 and the discrimination result in the step S6 is NO, the process returns to the step S2 to continue the job or to carry out the job over again. In this case, the same selected printer may be used if the fault is corrected, but if not, another printer is selected for the job. In any case, the job is completed by use of a most appropriate one of the printers $10_1$ through $10_3$.

Figure 4:
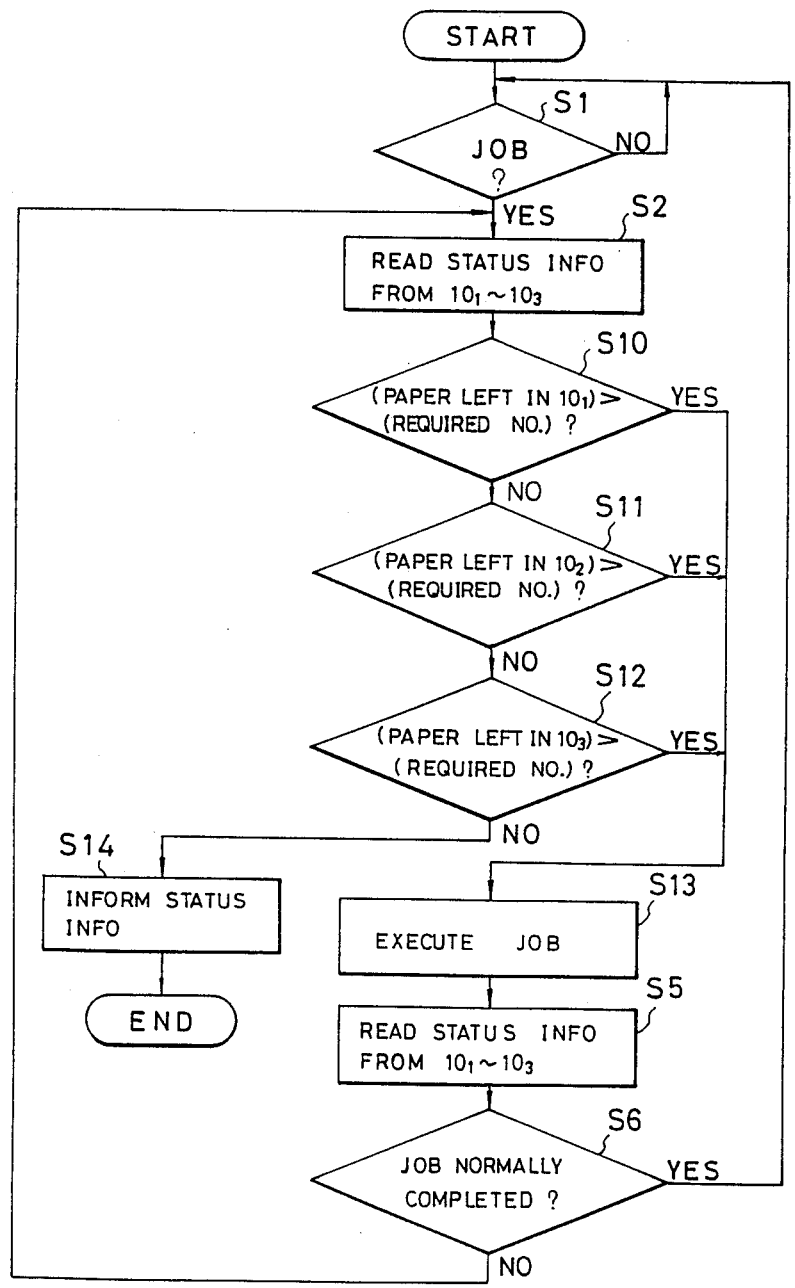
FIG. 4 is a flow chart showing a second embodiment of the operation of a host system in the second embodiment of the image forming system.

FIG. 4 shows a second embodiment of the operation of the host system 11 in FIG. 2. In FIG. 4, those steps which are essentially the same as those corresponding steps in FIG. 3 are designated by the same reference characters, and a description thereof will be omitted. A step S10 discriminates whether or not the quantity of paper (that is, number of sheets) remaining in the printer $10_1$ is greater than the quantity of paper required to complete the job. When the discrimination result in the step S10 is NO, a step S11 discriminates whether or not the quantity of paper remaining in the printer $10_2$ is greater than the quantity of paper required to complete the job. When the discrimination result in the step S11 is NO, a step S12 discriminates whether or not the quantity of paper remaining in the printer $10_3$ is greater than the quantity of paper required to complete the job.

When the discrimination result in one of the steps S10 through S12 is YES, a step S13 carries out the job by use of one of the printers $10_1$ through $10_3$ which is considered to be best suited for carrying out the job depending on the situation. Steps similar to the steps S3 and S4 shown in FIG. 3 may be used for the step S13. The rest of the process after the step S13 is the same as that shown in FIG. 3.

On the other hand, when the discrimination result in the step S12 is NO, a step S14 informs the status information on the printers $10_1$ through $10_3$. In other words, a message is displayed or printed to indicate that paper needs to be supplied to the printers $10_1$ through $10_3$. In the case where other status information is used for the discrimination in the steps S10 through S12, a fault and the like is displayed or printed. The display of the message in the step S14 may be made at the host system 11, or the display or printing of the message in the step S14 may be made at one of the printers $10_1$ through $10_3$. In addition, the step S14 may transmit the message through the facsimile machine 22, for example.

Therefore, according to the second embodiment of the image forming system, it is possible to use a plurality of printers with approximately the same frequency, make the maintenance timings of the plurality of printers approximately coincide, and the like, by selecting the printer to be used for each job based on appropriate status information. It is possible to ensure completion of the job by selecting the printer having parts with the longest remaining serviceable lives. If the first selected printer cannot complete the job for some reason, another suitable printer will be selected automatically to positively complete the job. In addition, the printers having parts with relatively short remaining serviceable lives may be selectively used during the daytime and the printers having parts with the longer remaining serviceable lives may be selectively used during late hours so as to effectively avoid the need for the serviceman at night. As a result, each of the printers $10_1$ through $10_3$ can be maintained in an optimum operating state and the maintenance of the printers $10_1$ through $10_3$ can be carried out with a high efficiency, thereby making the reliability of the image forming system extremely high.

In the first and second embodiments of the image forming system according to the present invention, one or a plurality of printers are coupled to the host system. However, other image forming apparatuses such as facsimile machines and copying machines may be coupled to the host system, and the first and second embodiments are similarly applicable to operate such machines in a optimum state.

It is highly desirable that the maintenance of the printer can be made by the user (operator). For example, there is a demand not only to supply expendables such as the toner, but also replace the photosensitive unit, the cleaning unit and the like by the user.

Conventionally, there is a printer provided with a single replaceable unit which integrally comprises a plurality of parts. The replaceable unit is changed with a new unit when the serviceable life of a part of the replaceable unit ends. However, the parts of the replaceable unit naturally have different serviceable lives. Hence, there is a problem in that the whole replaceable unit must be changed even though the serviceable life of only one of the parts has ended and the remaining parts can still be used. As a result, the running cost of this printer having the single replaceable unit is expensive.

In order to eliminate the problem of the above described conventional printer, it is possible to provide a plurality of replaceable units having mutually different replacing intervals. In this case, it is necessary to design the printer so that each replaceable unit can be changed with ease. But each replaceable unit must be accurately positioned within the printer, and each replaceable unit is located within a limited space inside the printer. For this reason, the changing of the replaceable units inevitably becomes difficult and troublesome for the user. When changing one replaceable unit, the other replaceable unit may be hit and damaged as the old replaceable unit is being removed or as the new replaceable unit is being set. For example, the toner may fall from a container and stain inner parts of the printer when the replaceable unit is being changed, because of the limited space in which the user must work.

As still another method of enabling the maintenance of the printer by the user, it is possible to design the printer so that the parts can be pulled out from the printer body together with an image forming unit. In other words, the parts are pulled out from the printer body in a state where the parts are positioned in respective operative positions with respect to the image forming unit with a certain positioning accuracy to ensure a normal operation. However, since the parts are positioned in the respective operative positions with the certain positioning accuracy, the removal and setting of the parts on the image forming unit are difficult to perform because there is no play. Therefore, it takes time to change a replaceable unit, and the maintenance efficiency is poor.

Next, a description will be given on an embodiment of the image forming apparatus which enables easy and accurate replacement of parts of the image forming unit such as the photosensitive unit, the developing unit, the cleaning unit and the like. For example, this embodiment of the image forming apparatus can be applied to non-impact printers employing the electrophotography method, copying machines and the like.

Figure 5:
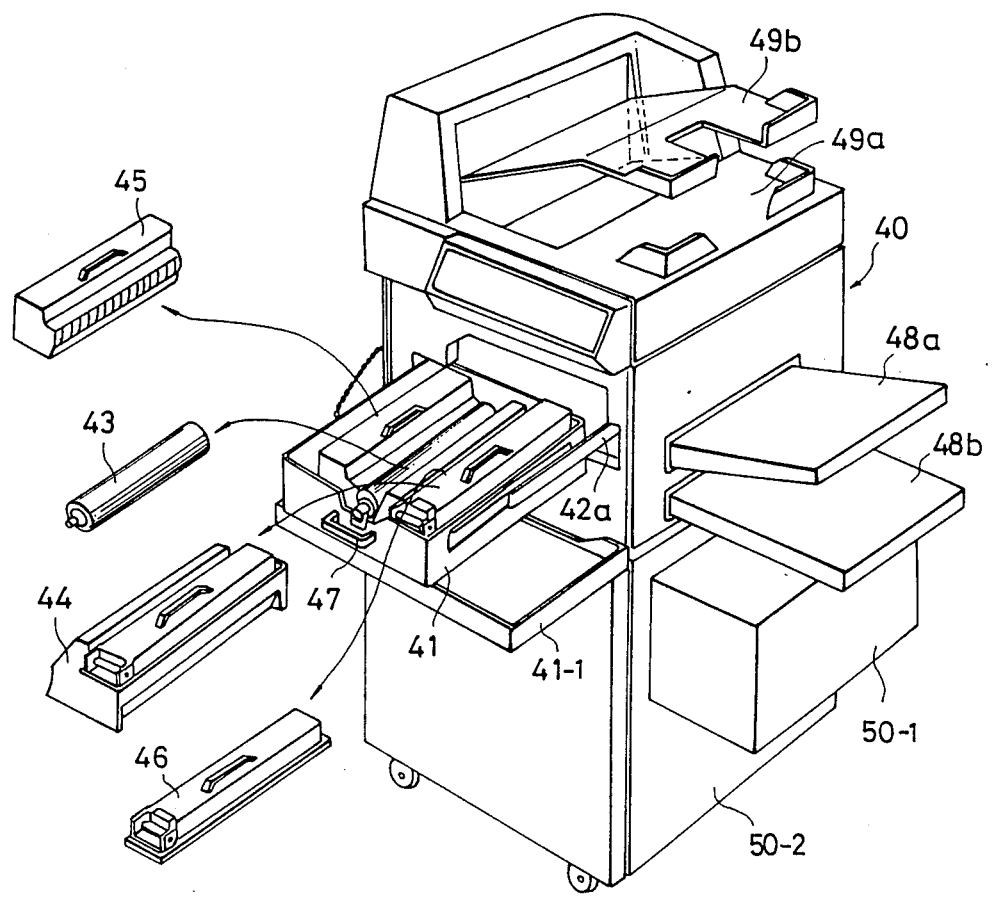
FIG. 5 is a perspective view showing an embodiment of a laser printer in a state where a drawer holding an image forming unit (replaceable unit) is pulled out from a main printer body.
Figure 6:
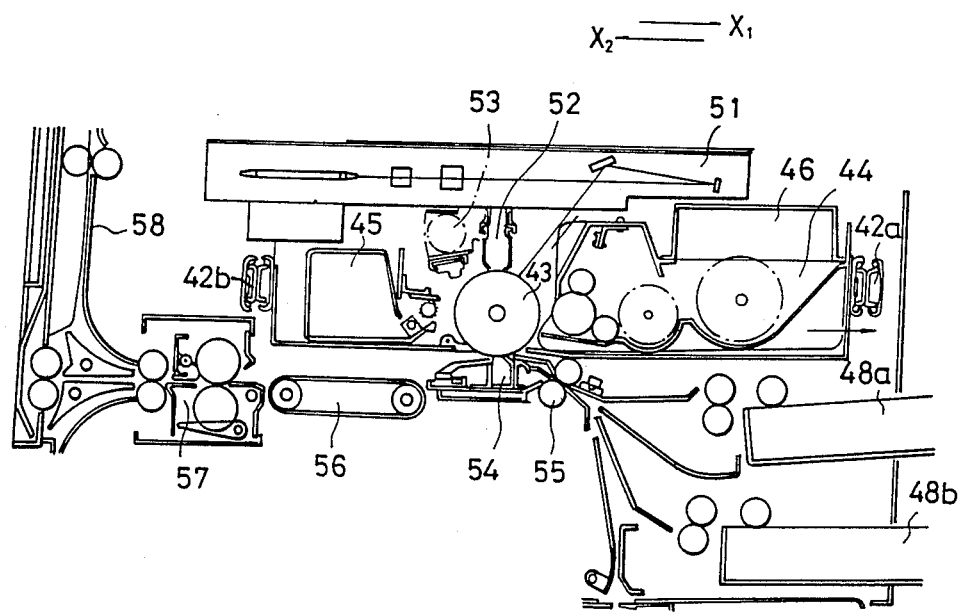
FIG. 6 is a cross sectional view showing a portion of the drawer of the laser printer.

FIG. 5 shows a perspective view of a laser printer in a state where a drawer 41 holding an image forming unit (replaceable unit) is pulled out from a main printer body 40. FIG. 6 shows a portion of the drawer 41 in a cross section.

As shown in FIGS. 5 and 6, the drawer 41 is provided on a side of the main printer body 40 slidable along guide rails 42a and 42b. A photosensitive unit 43, a developing unit 44, a cleaning unit 45, a toner cartridge 46 and the like constituting an image forming unit are accommodated in the drawer 41. These units 43 through 46 and the like are detachably accommodated in the drawer 41 and positioned with a certain accuracy to satisfy a predetermined positional relationship when the drawer 41 is pushed into an operative position in the main printer body 40, so that the recording operation according to the electrophotography method can be carried out correctly. The units 43 through 46 are also positioned to maintain an appropriate positional relationship with an optical unit 51, a charger unit 52, a discharge lamp 53, a transfer charger 54, a resist roller 55 and the like provided on the main printer body 40.

When the drawer 41 is pulled out of the main printer body 40, the developing unit 44 and the toner cartridge 46 are automatically separated toward a direction $X_1$ in FIG. 6 with respect to the photosensitive unit 43, while the cleaning unit 45 is automatically separated toward a direction $X_2$ in FIG. 6. Hence, the units 44 and 45 automatically separate from each other when the drawer 41 is pulled out of the main printer body 40, and slight marginal spaces are formed between two mutually adjacent units to facilitate the removal of each unit when the serviceable life thereof ends and a replacement needs to be set. In addition, the possibility of damaging the units during the removal and setting of the unit is greatly reduced because of the slight marginal space.

A handle 47 is provided on a front surface of the drawer 41 to facilitate the pulling out of the drawer 41. Handles are also provided on the developing unit 44, the cleaning unit 45, the toner cartridge 46 and the like as shown in FIG. 5. However, for convenience' sake, the illustration of these handles are omitted in FIG. 6 to simplify the drawings.

The main printer body 40 comprises in addition to the drawer 41 accommodating the image forming unit, the optical unit 51 and the like above described, a first paper supplying cassette 48a and a second paper supplying cassette 48b for supplying paper, a fixing unit 57 for fixing the toner image on the paper developed by the image forming unit, a transport part 56 and the like. In addition, a first ejecting tray 49a and a second ejecting tray 49b are provided on an upper portion of the main printer body 40 for receiving the recorded paper ejected by way of the transport part 56.

The main printer body 40 is arranged on an option unit 50-2 which is provided according to the needs of the user. The option unit 50-2 is made up of an independent paper supplying unit 50-1 for supplying a large quantity of paper, and a reversing unit (not shown). The reversing unit is used to reverse the side of the recorded paper having one side thereof recorded at the fixing unit 57, so as to supply the reversed paper back to the image forming unit for recording on the other side.

A cover 41-1 is closed upwardly in FIG. 5 in the state where the drawer 41 is pushed into the operative position in the main printer body 40. The closed cover 41-1 prevents dust particles and the like from entering the main printer body 40, and also improves the external appearance of the laser printer.

Figure 7:
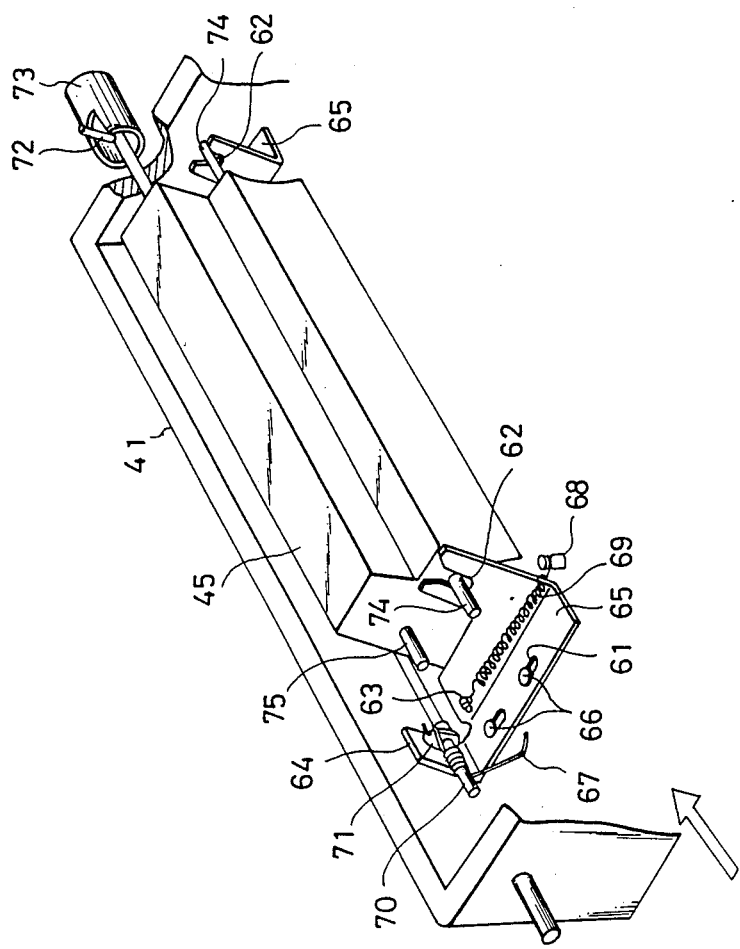
FIGS. 7 and 8 are a perspective view and a side view respectively showing an essential part of a mechanism for separating a cleaning unit from a photosensitive unit when a drawer is pulled out of the main printer body.
Figure 8:
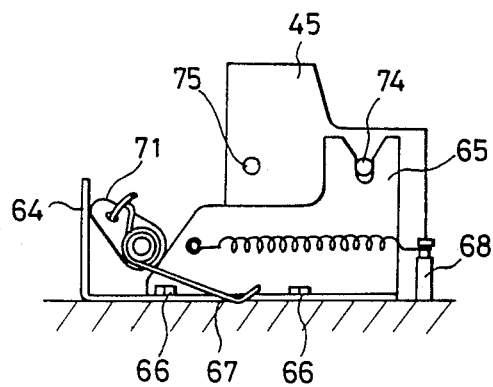

FIGS. 7 and 8 show an essential part of a mechanism for separating the cleaning unit 45 from the photosensitive unit 43 as the drawer 41 is pulled out of the main printer body 40. A pair of sliders 65a and 65b are respectively arranged at the front and rear of the drawer 41 along the pull-out direction of the drawer 41. The slider 65a comprises elongated holes 61, a cutout 62 for holding the cleaning unit 45, a pin 63 for supporting a coil spring 69, and a cam contact part 64. The sliders 65a and 65b are mounted on the drawer 41 by guide pins 36 in a slidable state with respect to the drawer 41. The coil spring 69 is provided between the pin 63 on the slider 35a and a spring support pin 68 located on a bottom portion of the drawer 41. The slider 65b essentially has the same construction as the slider 65a, and a description thereof will be omitted.

A rod 70 penetrates plates provided on the front and rear of the drawer 41, and a cam 71 is fixed on the rod 70 at a position corresponding to a position of the cam contact part 64 on the slider 65a. A torsion spring 67 is fit on the rod 70 and mounted so as to urge the rod 70 to rotate in an axial direction thereof. Although not shown in FIG. 7, a similar cam and torsion spring are provided with respect to the slider 65b. A pin 72 for engaging a cam 73 provided on the main printer body 40 is located on the rear end portion of the rod 70.

Figure 9:
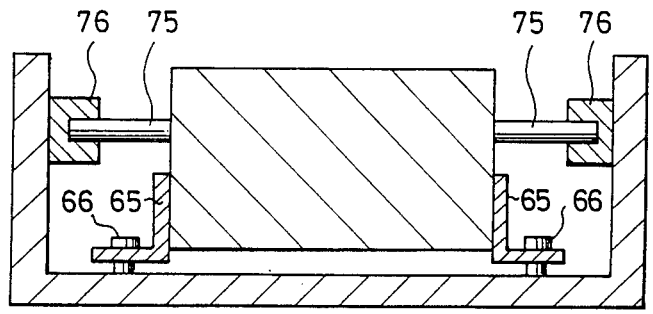
FIG. 9 is a cross sectional view showing a mechanism for supporting the cleaning unit on the drawer.
Figure 10:
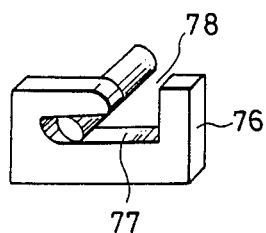
FIG. 10 is a perspective view showing a pin support.

The cleaning unit 45 comprises four pins provided on both sides at the front and rear thereof. Out of these four pins, two pins 74 shown in FIG. 7 fit into the respective cutouts 62 of the sliders 65a and 65b and are held thereby. As shown in FIG. 9, remaining two pins 75 of the cleaning unit 45 are held by respective pin supports 76 provided on side walls of the drawer 41. And, as shown in FIG. 10, the pin supports 76 each having a substantially L-shaped hole 77 having an upper cutout portion 78.

When the drawer 41 which holds the image forming unit described heretofore is pushed into the operative position in the main printer body 40, the pin 72 at the end of the rod 70 is urged toward the inside of the main printer body 40 to make contact with the cam 73 of the main printer body 40. In this state, the torsion spring 67 prevents the cam 71 from rotating. For this reason, only the resilient forces of the coil springs 69 effectively act on the sliders 65a and 65b, thereby positioning the cleaning unit 45 supported by the sliders 65a and 65b to the photosensitive unit 43, that is, at the original operative position of the cleaning unit 45. Therefore, the cleaning unit 45 is restricted to a position (reference position) pulled to the right in FIG. 7 due to the action of the coil spring 69.

On the other hand, in the state where the drawer 41 is pulled out of the main printer body 40, the pin 72 on the end of the rod 70 escapes the cam 73 and the rotational force of the torsion spring 67 acts on the cam 71 to push the cam contact part 64 of each of the sliders 65a and 65b. The spring force exerted by the torsion spring 67 is greater than that exerted by the coil spring 69, and for this reason, the sliders 65a and 65b slide to the left in FIG. 7. As a result, the cleaning unit 45 can easily be removed from the photosensitive unit 43 by pulling the pins 74 of the cleaning unit 45.

The description given heretofore relates to the removal of the cleaning unit 45, but the replacement by a new cleaning unit can be performed in a reverse sequence. Furthermore, a mechanism similar to that described for the cleaning unit 45 may be used for the developing unit 44 so as to facilitate the removal of the developing unit 44 from the photosensitive unit 43 as the drawer 41 is pulled out of the main printer body 40.

In the described embodiment, the automatic separation of the units on the drawer 41 as the drawer 41 is pulled out of the main printer body 40 is achieved by use of a combination of a plurality of cam mechanisms which detect the position of the drawer 41 and slide one or more units depending on the detected position of the drawer 41. However, other means such as a solenoid mechanism may be used in place of the cam mechanisms. In this case, one or more units can be slide by the solenoid mechanism depending on an electrical detection of the position of the drawer 41.

Therefore, the laser printer having such an easy access system for replacing the units is especially suited for applications in the image forming system of the present invention.

Further, the present invention is not limited to these embodiments, but various variations and modifications may be made without departing from the scope of the present invention.

What is claimed is

1. An image forming system comprising:
   an image forming apparatus at least comprising an image forming part for forming an image, a sensor part for detecting status information on said image forming apparatus, a memory for storing the status information, an operation and display part for entering an instruction to said image forming apparatus and for displaying a message and a control part for controlling an operation of said image forming apparatus; and
   a host system coupled to said image forming apparatus through said control part,
   said control part having means for controlling said memory to read out said status information at an arbitrary time, and means for converting said status information into a message.

2. An image forming system as claimed in claim 1 in which said control part controls said memory to read out said status information from said memory and display a corresponding message on said operation and display part.

3. An image forming system as claimed in claim 1 in which said host system comprises means for reading out said status information from said memory through said control part.

4. An image forming system as claimed in claim 1 in which said status information relates to an operating state and an abnormal state of said image forming apparatus.

5. An image forming system as claimed in claim 1 in which said status information includes at least one of quantities of paper used and left in said image forming apparatus, times when serviceable lives of parts of said image forming apparatus end and require replacements, a record of faults occurred in said image forming apparatus, a maintenance record on said image forming apparatus, a serviceman maintenance record on said image forming apparatus, a record on jams occurred in said image forming apparatus, and a total running time of said image forming apparatus.

6. An image forming system as claimed in claim 1 in which said image forming apparatus is selected from a group of a printer, a copying machine, and a facsimile machine.

7. An image forming system comprising:
an image forming apparatus at least comprising an image forming part for forming an image, a sensor part for detecting status information on said image forming apparatus, a memory for storing the status information, an operation and display part for entering an instruction to said image forming apparatus and for displaying a message, and a control part for controlling an operation of said image forming apparatus; and
a host system coupled to said image forming apparatus through said control part.
said control part having means for controlling said memory to read out said status information at an arbitrary time,
said status information being related to replacement intervals of parts of said image forming apparatus having certain serviceable lives and supplying intervals of expendables of said image forming apparatus.

8. An image forming system as claimed in claim 7 in which said image forming apparatus further comprises a main body, a unit integrally having said parts detachably arranged thereon, said unit being pulled out from said main body when replacing one of said parts, and means provided on said unit for mutually separating at least two of said parts from each other when said unit is pulled out of said main body, so that a marginal space is formed around said two parts for facilitated removal thereof.

9. An image forming system comprising:
a plurality of image forming apparatuses each comprising at least an image forming part for forming an image, a sensor part for detecting status information on said image forming apparatus, a memory for storing the status information, an operation and display part for entering an instruction to said image forming apparatus and for displaying a message, and a control part for controlling an operation of said image forming apparatus; and
a host system coupled to each of said image forming apparatuses through said control part,
said control part in each of said image forming apparatuses having means for controlling said memory to read out said status information at an arbitrary time, and means for converting said status information into a message.

10. An image forming system as claimed in claim 9 in which said control part controls said memory to read out said status information from said memory and display a corresponding message on said operation and display part.

11. An image forming system as claimed in claim 9 in which said host system comprises means for reading out said status information from said memory through said control part in an arbitrary one of said image forming apparatuses.

12. An image forming system as claimed in claim 9 in which said status information relates to an operating state and an abnormal state of each of said image forming apparatus.

13. An image forming system as claimed in claim 9 in which said status information includes at least one of quantities of paper used and left in each of said image forming apparatuses, times when serviceable lives of parts of each of said image forming apparatuses end and require replacements, a record of faults occurred in each of said image forming apparatuses, a maintenance record on each of said image forming apparatuses, a serviceman maintenance record on each of said image forming apparatuses, a record on jams occurred in each of said image forming apparatuses, and a total running time of each of said image forming apparatuses.

14. An image forming system as claimed in claim 9 in which each of said image forming apparatuses are selected from a group of a printer, a copying machine, and a facsimile machine.

15. An image forming system comprising:
a plurality of image forming apparatuses each comprising at least an image forming part for forming an image, a sensor part for detecting status information on said image forming apparatus, a memory for storing the status information, an operation and display part for entering an instruction to said image forming apparatus and for displaying a message, and a control part for controlling an operation of said image forming apparatus; and
a host system coupled to each of said image forming apparatuses through said control part,
said control part in each of said image forming apparatuses having means for controlling said memory to read out said status information at an arbitrary time, and means for converting said status information into a message,
said control part controlling said memory to read out said status information from said memory and print a corresponding message on said image forming part.

16. An image forming system comprising:
a plurality of image forming apparatuses each comprising at least an image forming part for forming an image, a sensor part for detecting status information on said image forming apparatus, a memory for storing the status information, an operation and display part for entering an instruction to said image forming apparatus and for displaying a message, and a control part for controlling an operation of said image forming apparatus; and
a host system coupled to each of said image forming apparatuses through said control part,
said control part in each of said image forming apparatuses having means for controlling said memory to read out said status information at an arbitrary time,
said status information being related to replacement intervals of parts of each of said image forming apparatuses having certain serviceable lives and supplying intervals of expendables of each of said image forming apparatuses.

17. An image forming system as claimed in claim 16 in which at least one of said image forming apparatuses further comprise a main body, a unit integrally having said parts detachably arranged thereon, said unit being pulled out from said main body when replacing one of said parts, and means provided on said unit for mutually separating at least two of said parts from each other when said unit is pulled out of said main body, so that a marginal space is formed around said two parts for facilitated removal thereof.

18. An image forming system comprising:
a plurality of image forming apparatuses each comprising at least an image forming part for forming an image, a sensor part for detecting status information on said image forming apparatus, a memory for storing the status information, an operation and display part for entering an instruction to said image forming apparatus and for displaying a message, and a control part for controlling an operation of said image forming apparatus; and
a host system coupled to each of said image forming apparatuses through said control part,
said control part in each of said image forming apparatuses having means for controlling said memory to read out said status information at an arbitrary time,
said host system comprising first means for reading out said status information from each of said image forming apparatuses through said control part, and second means for automatically selecting one of said image forming apparatuses for carrying out a job depending on said status information.

19. An image forming system as claimed in claim 18 in which said second means of said host system continues the selection of one of said image forming apparatuses until the job is completed.

20. An image forming system comprising:
an image forming apparatus at least comprising an image forming part for forming an image, a sensor part for detecting status information on said image forming apparatus, a memory for storing the status information, an operation and display part for entering an instruction to said image forming apparatus and for displaying a message, and a control part for controlling an operation of said image forming apparatus; and
a host system coupled to said image forming apparatus through said control part,
said control part having means for controlling said memory to read out said status information at an arbitrary time, and means for converting said status information into a message,
said control part controlling said memory to read out said status information from said memory and print a coresponding message on said image forming part.

* * * * *